US012695002B2

(12) United States Patent
Deane et al.

(10) Patent No.: US 12,695,002 B2

(45) Date of Patent: Jul. 28, 2026

(54) ALUMINUM-SCANDIUM ALLOYS FOR BUSBARS

(71) Applicant: YAZAKI CORPORATION, Tokyo (JP)

(72) Inventors: Kyle Deane, Camarillo, CA (US); Markus Boehm, Nuremberg (DE); Jeyakumar Manickaraj, Newbury Park, CA (US); Stefan Maat, Camarillo, CA (US)

(73) Assignee: YAZAKI CORPORATION, Tokyo (JP)

( * ) Notice: Subject to any disclaimer, the term of this patent is extended or adjusted under 35 U.S.C. 154(b) by 434 days.

(21) Appl. No.: 18/318,949

(22) Filed: May 17, 2023

(65) Prior Publication Data

US 2023/0290534 A1 Sep. 14, 2023

Related U.S. Application Data

(63) Continuation of application No. PCT/US2021/072495, filed on Nov. 18, 2021.

(60) Provisional application No. 63/115,901, filed on Nov. 19, 2020.

(51) Int. Cl.

| | |
|---|---|
| ***H01B 1/02*** | (2006.01) |
| ***B21C 1/00*** | (2006.01) |
| ***C22C 21/00*** | (2006.01) |
| ***C22F 1/04*** | (2006.01) |

(52) U.S. Cl.

CPC ............ *H01B 1/023* (2013.01); *B21C 1/003* (2013.01); *C22C 21/00* (2013.01); *C22F 1/04* (2013.01)

(58) Field of Classification Search

None

See application file for complete search history.

(56) References Cited

U.S. PATENT DOCUMENTS

| | | | |
|---|---|---|---|
| 3,794,484 | A | 2/1974 | Chia et al. |
| 9,797,030 | B2 | 10/2017 | Huskamp et al. |
| 10,030,293 | B2 | 7/2018 | Palm |
| 2011/0267673 | A1 | 11/2011 | Agrawal et al. |
| 2012/0103476 | A1 | 5/2012 | Newman et al. |
| 2013/0220497 | A1 | 8/2013 | Huskamp et al. |
| 2018/0094340 | A1 | 4/2018 | Ferrasse et al. |

FOREIGN PATENT DOCUMENTS

| | | | |
|---|---|---|---|
| CN | 102586655 | A1 | 7/2012 |
| CN | 105483455 | A | 4/2016 |
| CN | 106756265 | A | 5/2017 |

(Continued)

OTHER PUBLICATIONS

United States Patent & Trademark Office (USPTO), International Search Report, PCT/US2021/072495.

(Continued)

*Primary Examiner* — Anthony M Liang

(74) *Attorney, Agent, or Firm* — Ashurst Perkins Coie US LLP; Viola T. Kung; Jacob Levenson

(57) ABSTRACT

A busbar for electric power distribution comprises an aluminum (Al) alloy including scandium (Sc) and optionally including zirconium (Zr), erbium (Er), and/or ytterbium (Yb). In an example, the Sc and/or other elements are uniformly distributed throughout an entirety of the Al alloy. In an example, the Al is in a range of 98 to 99.99 percent by weight (wt %), and the scandium (Sc) is in a range of 0.01 to 0.5 wt %.

16 Claims, 8 Drawing Sheets

(56) References Cited

FOREIGN PATENT DOCUMENTS

| | | | |
|---|---|---|---|
| CN | 107447135 | A1 | 12/2017 |
| CN | 107587004 | B1 | 1/2018 |
| JP | 2016035079 | A | 3/2016 |

OTHER PUBLICATIONS

Kilicaslan M Fatih et al, "Production of CNT-bearing melt-spun Al—2Sc-0.05CNT alloys", Journal of Alloys and Compounds, Elsevier Sequoia, Lausanne, CH, vol. 738, pp. 182-187.

European Patent Office (EPO), Extended European Search Report, EP No. 21895883.3, May 19, 2025, pp. 1-4.

ALUMINUM-SCANDIUM ALLOYS FOR BUSBARS

CROSS-REFERENCE TO RELATED APPLICATIONS

This application claims priority to, and is a 35 U.S.C. § 111(a) continuation of PCT international application number PCT/US2021/072495 filed on Nov. 18, 2021, incorporated herein by reference in its entirety, which claims priority to, and the benefit of, U.S. provisional patent application Ser. No. 63/115,901 filed on Nov. 19, 2020, incorporated herein by reference in its entirety. Priority is claimed to each of the foregoing applications.

TECHNICAL FIELD

The disclosed teachings relate to aluminum alloy composites for busbar applications.

BACKGROUND

In electric power distribution, busbars are metallic strips or bars, typically housed inside switchgears, panel boards, and busway enclosures for local high current power distribution. They are also used to connect high voltage equipment at electrical switchyards, and low voltage equipment in battery banks. They are generally uninsulated and have sufficient stiffness to be supported in air by insulated pillars. These features allow sufficient cooling of the busbar conductors, and the ability to tap into a conductor at various points without creating a new joint.

The material composition and cross-sectional size of a busbar determines a maximum amount of current that can be safely carried. Busbars can have a cross-sectional area of as small as 10 square millimeters ($mm^2$), but electrical substations may use metal tubes that are about 50 mm in diameter (or about 2,000 $mm^2$) or more as busbars.

Busbars are produced in a variety of shapes, such as flat strips, solid bars, or rods, and are typically composed of copper, brass, or aluminum (Al). Some of these shapes allow heat to dissipate more efficiently due to their high surface area to cross-sectional area ratio. The skin effect makes 50-60 Hz AC busbars inefficient when greater than about 8 mm thick; accordingly, hollow or flat shapes are prevalent in higher-current applications. A hollow section also has higher stiffness than a solid rod of equivalent current-carrying capacity, which allows for a greater span between busbar supports in outdoor electrical applications.

BRIEF DESCRIPTION OF THE DRAWINGS

One or more embodiments of the present disclosure are illustrated by way of example and not limitation in the Figures of the accompanying drawings, in which like references indicate similar elements.

DETAILED DESCRIPTION OF THE INVENTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying embodiments.

Busbar Applications

Figure 1:
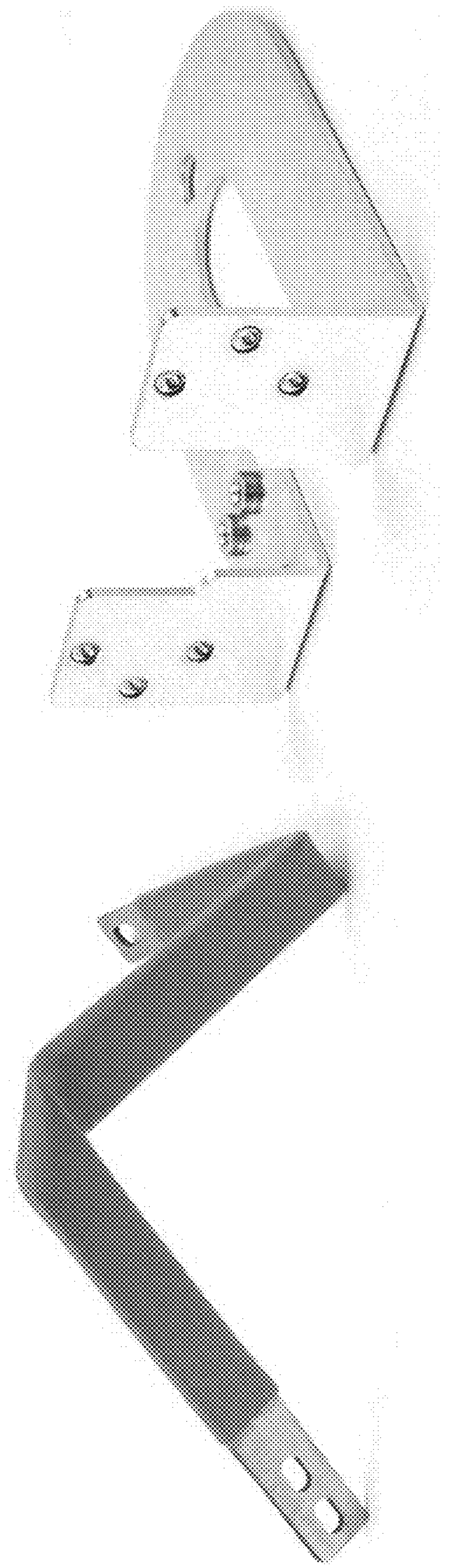
FIG. 1 shows examples of commercially available busbars.

In electric power distribution, a busbar is a metal strip or bar for local high current power distribution. FIG. 1 includes images of examples of commercially available copper (Cu) busbars. The marine, transportation, telecommunications, utility and power generation industries include applications of busbars. The automotive industry can also include a variety of busbars to provide a robust method of distributing high current electricity. These industries can benefit by replacing Cu busbars with aluminum (Al) to reduce weight and cost. For example, in the automotive industry, with rising interest in electric vehicles (EV) or hybrid electric vehicles (HEV), power distribution requirements and, consequently, the quantity of busbars required in these vehicles has risen significantly.

As busbars are traditionally made from Cu, the increase in busbar use has a negative impact on vehicle weight. With a density and electrical conductivity of about 30% and about 60% that of Cu, respectively, Al can achieve similar power distribution with a weight savings of about 50% over Cu. Moreover, while the cost of raw materials and industrial process will fluctuate, Al will generally be much less expensive than Cu. The busbars of FIG. 1 are tin plated copper examples of busbars that could be replaced with the aluminum alloys discussed herein. Thus, because Al conductors intended for the same electrical requirements are both lighter and less expensive than Cu conductors, substituting the Cu busbars with Al busbars in automotive applications could offset the rising weight and costs while still satisfying electrical power requirements.

In the automotive industry, busbars are used in a variety of applications as a robust means of distributing high current electricity. Typical uses include connecting individual cells in a battery pack, connecting multiple battery packs, and connecting battery packs to motor inverters and other electrical components. Some busbars are used in parts of the vehicle that see elevated temperatures. Busbars can be simple straight connections between two or more components, or they can have complex geometries to navigate through tightly packed areas of the vehicle (see FIG. 1). Hence, ideal Al alloys for busbar applications are capable of being formed into complex shapes without cracks and strong enough to maintain those shapes throughout the life cycle of the busbar.

Metal aging is a common way to alter properties of a metal alloy. In particular, aging can alter the physical and aesthetic properties of an alloy to give it characteristics different from its unaged form. An alloy at about its peak strength and hardness is referred to as "fully aged." In contrast, "over-aging" refers to aging at a higher temperature or for a longer time than is required to reach peak strength, thus causing, for example, loss of strength.

Commercially available Al alloys are not ideal substitutes for Cu in busbar applications, as there are limitations associated with the alloying element additions currently used in these alloys. The strength of Al alloys can be increased by adding alloying elements; however, additions typically used in commercial alloys come with a tradeoff of decreased electrical conductivity because any elements in solution with the solid a Al matrix phase act as additional electron scattering sites. Further, alloying elements in commercial Al alloys have relatively high mobility in the α Al phase, which results in a decrease in strength due to over-aging if they are held at elevated temperatures. This tendency to over-age can also have a negative effect on elevated temperature creep resistance of typical Al alloys.

Aluminum-Scandium Alloys

The disclosed embodiments relate to applications of Al alloys comprising scandium (Sc) and optionally comprising one or more other elements selected from a group consisting of Zirconium (Zr), Erbium (Er), and Ytterbium (Yb), and the advantages provided by such alloys for applications such as busbars. As used herein, the designation "Al—Sc—X" refers to an alloy of Al that comprises Sc, and optionally comprises "X" including Zr, Er, Yb, or any combination of the three. Thus, the Al—Sc—X alloys are mixtures of Al with other optional metals (as opposed to, for example, Al plated with another metal).

In an embodiment, Sc and/or X alloying elements are evenly or uniformly distributed over an entire volume of the Al alloy. That is, there are no significant irregular gaps or irregular distances between Sc- and/or X-containing particles, the Sc- and/or X-containing particles are not aggregated (or aggregations are negligible), and there are no areas of higher or lower concentrations of Sc and/or X alloying elements throughout the entire busbar. In this embodiment, the distribution of the alloying elements is essentially the same in all portions of the volume, i.e., there are no portions within the volume that have a distinct difference, i.e., more than 20%, 10%, or preferably 5% difference, in alloying element concentrations from any other portion.

In an embodiment, the resulting busbar also has a uniform density that is non-porous. For example, the density may deviate by 2% at most from a theoretical composite density, which can be calculated based on the volume of the material, the relative amounts of Al and components particles, and their respective densities. The even amounts can provide consistent and uniform characteristics such as uniform electrical conductance throughout the entire volume of the busbar. The uniform distribution of particles in a sample Al alloy busbar can be verified by high resolution microscopy.

The Al—Sc—X busbars have alloying additions with low solubility in the α Al phase, low mobility in Al at elevated temperatures, and offer significant strengthening and increased creep resistance for use in Al busbars and related products. In a preferred implementation, precipitation strengthening Al—Sc—X alloys provide the advantages of being in a soft condition before aging, for ease of forming, and of being in a strong condition after aging, for withstanding usage conditions.

The present invention makes use of the relatively high electrical conductivity of Al—Sc—X alloys, close to the electrical conductivity of pure Al, which results from the low solubility of Sc in the α Al phase. In contrast, prior investigation of Al—Sc—X alloys has been conducted mainly with the focus on the benefits of Sc additions regarding strength, creep resistance, and thermal stability in Al alloys, as well as on the specific structure and behavior of nanoscale $L1_2$ $Al_3X$ precipitates (where "X" refers to a variable element). As such, Al—Sc—X alloys have largely found use in structural applications, such as sporting equipment and aerospace but not in electrical applications and, more specifically, busbar applications.

Figure 2:
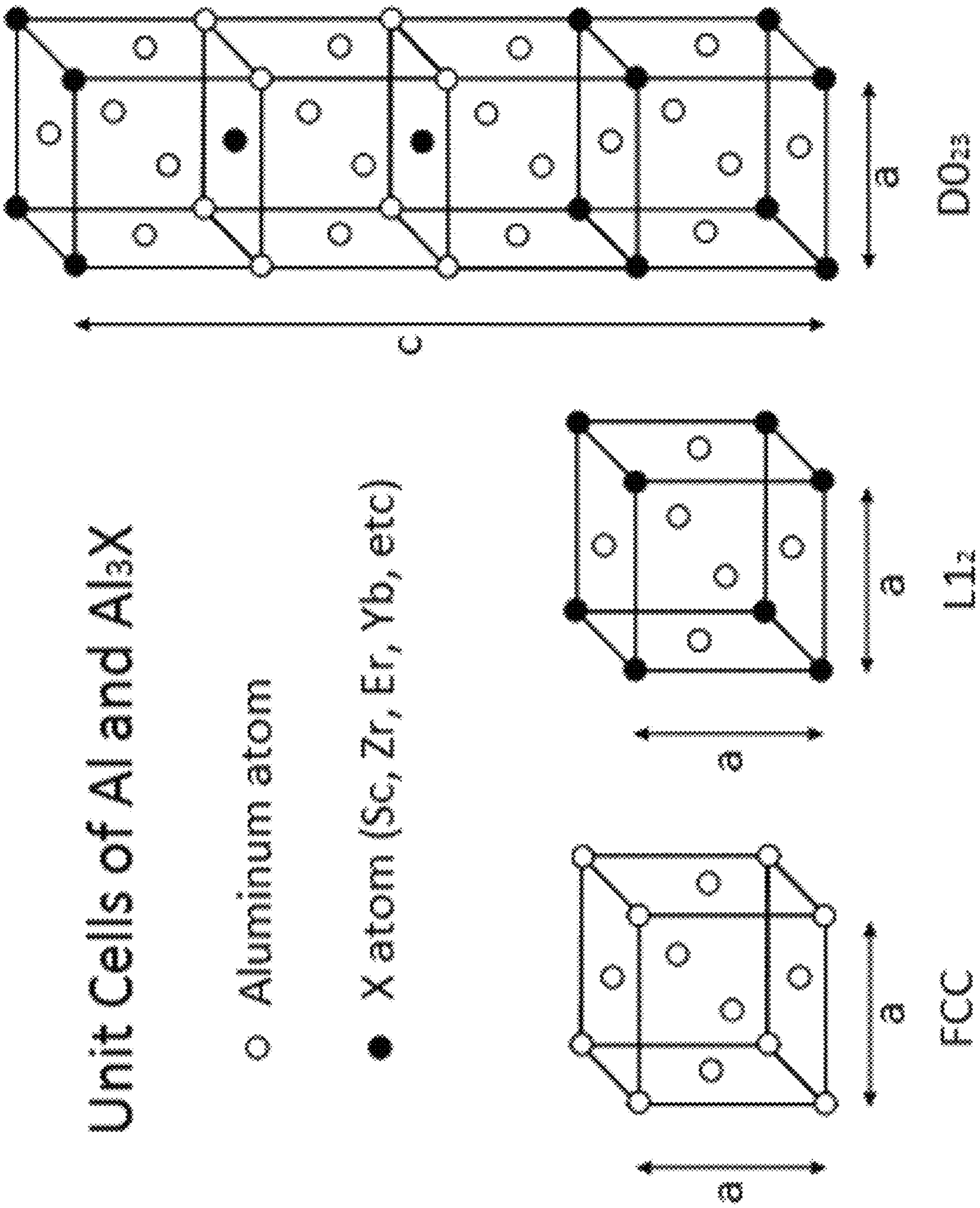
FIG. 2 illustrates ball and stick models of face-centered cubic (FCC), $L1_2$, and $D0_{23}$ unit cells.

Embodiments of the disclosed Al—Sc—X alloy include busbar applications. FIG. 2 depicts ball-and-stick models of face-centered cubic (FCC), $L1_2$, and $D0_{23}$ unit cells. Both $L1_2$ and $D0_{23}$ are $Al_3X$ phases, but $L1_2$ is more desirable for strengthening. As an alloying addition, Sc can form a stable trialuminide phase ($Al_3Sc$) with the $L1_2$ crystalline structure through precipitation aging heat treatments. The $L1_2$ structure is comparable to the FCC unit cell of the α Al phase, as illustrated in FIG. 2. Due to the similarity between the lattice parameters of the $Al_3Sc$ phase and that of α Al (1.32% mismatch), small $Al_3Sc$ precipitates are coherent with the α Al matrix and able to benefit from the Ordered Strengthening mechanism to offer a high strength-to-concentration ratio. In addition to the ability to form a preferred precipitate phase, Sc atoms have relatively low mobility and solubility in the Al matrix compared to commonly used alloying additions, which allows for small amounts of Sc to improve strength and thermal stability of Al without significantly decreasing electrical conductivity. A detractor for Sc as an alloying addition, however, is the current scarcity of Sc in the market, but this downside is mitigated by the small quantity required for the disclosed alloys.

To reduce the quantity of Sc required to reach a target strength, small quantities of zirconium (Zr) can be added in place of some of the Sc. Like Sc, Zr is a trialuminide former, but Zr differs from Sc in that it preferentially forms $Al_3Zr$ as a $D0_{23}$ phase instead of $L1_2$. See, e.g., FIG. 2. $D0_{23}$ is semi-coherent with the α Al matrix because of the non-cubic unit cell. However, in proximity to $Al_3Sc$ $L1_2$ phase, $Al_3Zr$ phase forms as a metastable $L1_2$ phase with a lattice mismatch with the Al matrix of only 0.75%, even lower than that of $Al_3Sc$. As Zr also has lower mobility in the Al matrix compared to Sc, the metastable $L1_2$ $Al_3Zr$ phase typically forms on the outside edge of existing $Al_3Sc$ precipitates, creating core-shell precipitate structures that have been shown to increase thermal stability in Al—Sc—Zr alloys compared to binary Al—Sc alloys. The "shell" structure refers to particles that have multiple alloying elements arranged in layers, which are preferably (but not necessarily) evenly distributed in the Al matrix.

Other alloying additions for the core-shell $Al_3X$ precipitate structure include erbium (Er) and ytterbium (Yb), which like Sc can form stable $L1_2$ trialuminide phase. A downside to Er and Yb includes an almost negligible solubility of these elements in the α Al matrix phase. The low solubility limits the ability of Er and Yb to strengthen Al through aging heat treatments, as essentially all Er and Yb atoms are formed into $L1_2$ $Al_3X$ precipitates during solidification. As such, $Al_3Er$ and $Al_3Yb$ can form the center of the core shell precipitate structure, with $Al_3Sc$ forming an intermediate shell and $Al_3Zr$ forming an outer shell. In addition to increasing the phase fraction of $Al_3X$ precipitate phase, additions of Er and Yb to Al—Sc—Zr alloys have been shown to significantly improve creep resistance.

To produce an Al busbar with desirable strength, thermal stability, and creep resistance, without significantly reducing the electrical conductivity below that of pure Al, it is beneficial to create a fine dispersion of strengthening precipitates surrounded by an a Al matrix that is relatively devoid of solute atoms. To achieve this, in one embodiment, alloying additions that have low solubility and low mobility in Al are used. Sc addition satisfies the criteria and offers a high amount of strengthening per atom through the precipitation of stable $Al_3Sc$ $L1_2$ nanoprecipitates. In one example, Sc is used in small quantities to create dilute Al alloys that can be used for an automotive busbar. To supplement a Sc addition, other elements such as Zr, Er, and/or Yb are used to add precipitate volume to the $L1_2$ nanoprecipitates and afford greater thermal stability and creep resistance to the busbars.

To additionally benefit from the addition of these elements, aging heat treatments must be performed to form a potential precipitate phase while allowing the α Al matrix phase to reach near equilibrium solute concentrations. If implemented correctly, the aging heat treatment simultaneously improves strength and electrical conductivity in these alloys. For binary Al—Sc alloys, aging heat treatments at temperatures between 275° C. and 350° C. are required, while Al—Sc—Zr alloys require a higher heat treatment temperature between 375° C. and 450° C. Further, these alloys can be continuously cast, as long as sufficient quenching is employed to avoid significant precipitation nucleation and growth during the solidification process and initial cooling.

Alternatively, these alloys can be extruded under three conditions. In one condition, if the extrusion temperatures are above solutionizing temperatures of an alloy (e.g., heating to form a homogeneous solid solution), and sufficient quenching is available immediately after extrusion, the alloy can be extruded in a softened (e.g., malleable) condition that is ready to be strengthened through aging heat treatments. In another condition, if processing temperatures are kept low enough during extrusion, over-aging can be avoided and the alloys can be extruded in a partially aged state. In another condition, if aging heat treatments are performed on a feedstock before extrusion, and processing temperatures are kept low enough during extrusion, the alloys can be extruded in a fully aged condition.

Figure 3:
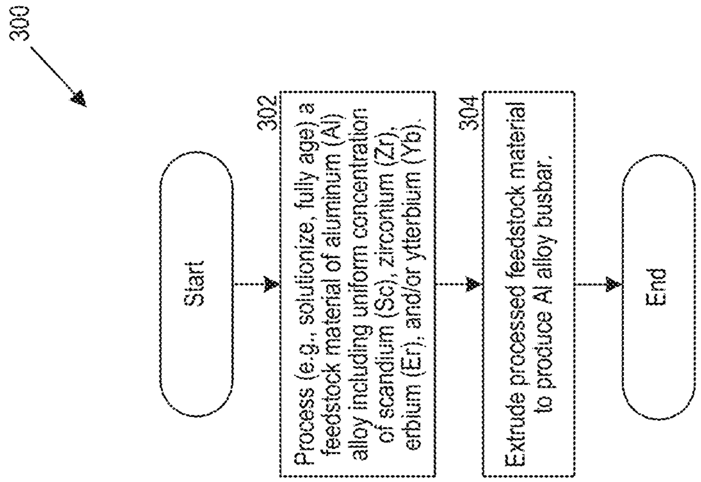
FIG. 3 is a flowchart that illustrates a process for producing a busbar of aluminum (Al) alloy according to the disclosed embodiments.

For example, FIG. 3 is a flowchart that illustrates a process 300 for producing a busbar of an Al alloy according to the disclosed embodiments. At 302, a feedstock material of Al alloy is processed. The feedstock includes one or more elements selected from the group consisting of Sc, Zr, Er, and Yb. For example, the feedstock material can be solutionized or can undergo full aging. The feedstock material can be in the form of a rod or granules. The distribution of the elements is uniform throughout an entirety of the Al alloy. At 304, the processed feedstock material is extruded to produce the Al alloy busbar.

If the Al—Sc—X alloy busbar is produced in a soft, solutionized condition, the busbar can be bent into a desired shape before it is strengthened with an aging heat treatment. The ability to form the busbars while they have less strength and higher elongation than in the fully aged condition allows for increased complexity of busbar geometries. Increasing the possible complexity can further reduce busbar weight by allowing for tighter bends that can reduce a required length of the busbar.

Figure 4:
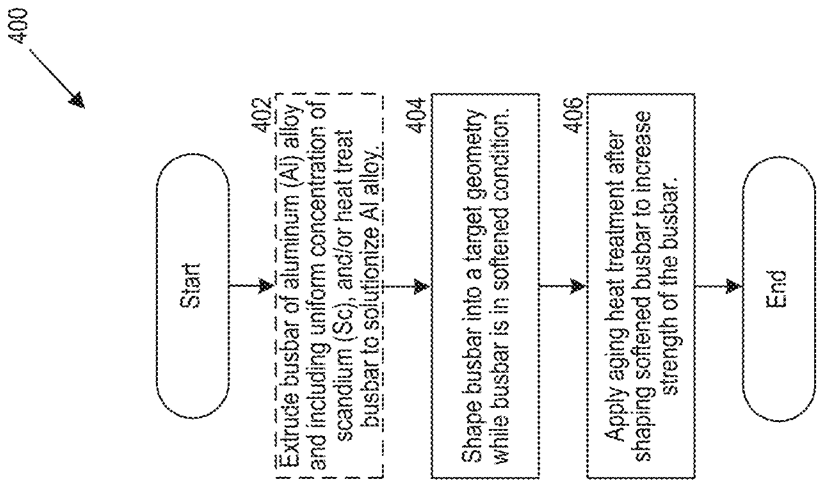
FIG. 4 is a flowchart that illustrates a process for producing a busbar having a targeted shape and desired strength.

For example, FIG. 4 is a flowchart that illustrates a process 400 for producing a busbar having a targeted shape and desired strength. At 402, a busbar including an Al alloy is optionally extruded. The busbar can include an amount of Sc that is distributed uniformly throughout an entirety of the Al alloy. The busbar can additionally include uniformly distributed amounts of Zr, Er, and/or Yb. The busbar can undergo heat treating in order to solutionize the Al alloy. At 404, the busbar is shaped into a target geometry while the busbar is in a softened condition. For example, the target can be a complex geometric shape. At 406, an aging heat treatment is applied to the shaped busbar to increase strength of the busbar.

If an alloy is extruded or cast with final dimensions and shape that are required for the busbar application, it can be aged and used with no other processing required. However, if cast or extruded in an oversized cross-sectional dimension or unfinished shape, the alloy can be worked down (e.g., through rolling) to the desired size and dimensions before performing aging heat treatments. In one example, cold work can slightly accelerate aging behavior and, as such, the aging heat treatments are adjusted to compensate for this behavior.

Al—Sc and Al—Sc—X alloys are materials that have many advantages for automotive busbar applications. Because these alloys are of the precipitation strengthening type, they can be formed into complex shapes while in a softened (e.g., malleable) condition before the strength is increased through aging heat treatment. Once aged, these alloys demonstrate desirable strength, thermal stability, and creep resistance while maintaining electrical conductivities near that of pure Al. Use of these alloys in automotive busbar applications could allow for improved ampacity for a given busbar cross-sectional area, as the high thermal stability can allow for increased operational temperature. This could enable weight reduction through a decrease of busbar dimensions or, if the busbar size remains the same, it could allow for a higher peak current draw without causing undesired issues. In addition, the creep resistance of these alloys could help reduce complications associated with connections between the busbars and other electrical components.

For example, with proper aging treatments, Al-0.13 wt % Sc can reach a UTS of greater than 200 MPa and an elongation greater than 7%. This particular alloy can maintain greater than 90% of its initial UTS after a one-hour heat treatment at 280° C., which is one of the requirements to qualify for the AT3 thermal stability requirements of International Electrotechnical Commission standard IEC 62004. One can readily appreciate the benefits of this when compared to work-hardened Al alloy 1350 H19, with a UTS of 185 MPa, about 1.5% elongation, and no significant thermal stability. Aged Al-0.13 wt % Sc has an electrical conductivity similar to that of Al 1350, at greater than about 55% IACS (International Annealed Copper Standard), preferably greater than about 58% IACS, and most preferably greater than about 60% IACS.

With the addition of small amounts of Zr to the alloys, a further increase in strength and thermal stability is achieved compared to binary Al—Sc alloys. For example, properly aged Al-0.13 wt % Sc-0.27 wt % Zr reaches a UTS of greater than 225 MPa, and can maintain greater than 90% of its initial UTS after a one-hour heat treatment at 400° C., which meets the AT4 thermal stability requirements of IEC 62004, the highest level of thermal stability defined in this specification. The addition of other trialuminide forming additives such as Er and Yb can further increase strength and creep resistance of these alloys.

Al—Sc—X Metal Matrix Composites

For certain busbar applications, it may be advantageous to add a non-metallic strengthening component to the Al—Sc—X alloy composition, thereby forming an Al—Sc—X metal matrix composite (MMC). In one embodiment, nanoscale carbon particles are added to the Al—Sc—X alloy to form an Al—Sc—X MMC. The nanoscale carbon particles can include single-walled carbon nanotubes (CNTs), multi-walled CNTs, graphene nanoplatelets (GNPs), few-layer graphene (FLG), single-layer graphene (SLG), fullerenes, nanodiamonds, and/or nanoparticles with predominantly $sp^2$ or $sp^3$ carbon. In one example, the nanoscale carbon particles include a mixture of particles selected from the group consisting of CNTs, GNPs, FLG, SLG, fullerenes, nanodiamonds, and nanoparticles with predominantly $sp^2$ or $sp^3$ carbon. The Al—Sc—X MMC busbar can include nanoscale carbon particles. The amount of the nanoscale carbon particles can be in a range of 0.01 to 2 weight percent (wt. %), such as of 0.1 to 1 wt. %, or such as of 0.2 to 0.8 wt. %, or such as of 0.25 to 0.75 wt. %, or such as of 0.4 to 0.6 wt. %.

Production Techniques

The disclosed embodiments include the production of busbars containing small amounts (e.g., 0.02-0.5 wt %) of component additions from the group consisting of Sc, Zr, Er, and/or Yb. Production of these busbars can be accomplished in accordance with various processing techniques, including a combination of one or more of the following processes:

Casting: Initial preparation of the Al—Sc—X busbar alloy may be by a casting process. The alloy may be cast in the shape of, for example, a rod, or as granules, or in another shape. Careful consideration of melt temperatures and hold times should be taken to ensure that the alloying elements are fully within the single-phase liquid Al phase to ensure the most efficient use of the alloying elements. Additionally, solidification and quenching of the alloy should generally be accomplished quickly to limit the amount of unwanted precipitation at this stage and maximize the quantity of alloying elements in the solution. This quenching rate can be less important in some cases where later processing steps (e.g., extrusion) will completely alter the precipitate structure.

Extrusion: Extrusion can be performed using Al alloy rods or Al alloy cast granules as a feedstock to produce a busbar with a target shape and dimensions or with dimensions that are larger than the target. Extrusion of a product with dimensions larger than the target should be considered if the final shape is unattainable by extrusion alone, or if intended properties of the busbar will benefit from the addition of cold work through rolling, etc. The alloys may be extruded in different stages of aging depending on the temperatures and feed rates of the extrusion process. For example, if the extrusion temperature is higher than the solvus temperature of the alloy and the extruded product is quenched quickly enough after extrusion, the alloying additions may be kept in solution and are ready for precipitate aging without requiring a post-extrusion solutionizing heat treatment. If the extrusion temperature is low enough, it will be possible to extrude a product that is already fully precipitation aged, whether it was aged during the extrusion or subjected to an aging treatment before the extrusion.

Rolling: Rolling can be performed on continuously cast or extruded products to reduce cross-sectional area and change the shape of the product. This process will typically be performed at room temperature, but it can be performed at elevated temperatures if simultaneous aging and stress relaxation are preferred. Depending on required properties, rolling can be performed before or after aging processes to increase the amount of residual stress in the final product. Higher residual stresses typically result in higher strengths and lower elongation; hence, some amount of rolling should be performed after the aging process is complete for applications where higher strength is required.

Aging: Aging can be performed to simultaneously improve the strength and electrical conductivity of the alloy. Where a rolling process is used, aging can be performed either before or after the rolling step. The times and temperatures of ideal aging heat treatments will depend on the alloying additions involved. For example, precipitation of $Al_3Sc$ should be performed at about 300° C. due to the mobility of Sc in the Al matrix, while the lower mobility of Zr in the Al matrix requires a higher aging temperature of about 400° C. for $Al_3Zr$ precipitation. Aging heat treatments also depend on the amount of residual stress in the busbar at the time of aging, as higher residual stress can quicken precipitation behavior by providing more nucleation sites and lowering the barrier for mobility of the alloying elements. Therefore, aging treatments after rolling processes will need to be different than treatments before rolling. Additionally, multi-step aging treatments may be beneficial for these alloys, depending on the exact composition, to ensure an optimal precipitate structure is achieved.

Bending/Forming: Bending and/or forming can be performed on a busbar to achieve useful shapes for use within an automobile environment. Bending can include flatwise bending, edgewise bending, twisting, etc. This processing can be performed before or after aging heat treatments are applied, depending on the application and the required material properties during bending/forming. For example, cases in which the complexity of busbar geometry is high would benefit from bending in the soft condition before increasing the strength through aging heat treatments. As a counter example, the ability to form less complex busbar geometries from pre-aged busbar blanks and immediately put the busbars into service can help streamline production.

Example Al—Sc Results

The following examples include results that largely cover wire samples, which provide ease of manufacture and testing; however, busbars have been produced to verify similar results. Accordingly, a meaningful difference in the behavior of the alloys in wire and busbar form is unexpected and, as such, the results are applicable to busbars of the same alloys.

Optimally aged Al-0.13 wt % Sc wires maintain greater than 90% of their strength after a one-hour heat treatment at 280° C., which is a requirement to meet the AT3 thermal stability specification of IEC 62004. However, wires were not thermally stable enough to maintain greater than 90% of strength after a one-hour heat treatment at 400° C., which is a requirement to meet the AT4 thermal stability specification of IEC 62004.

Figure 5:
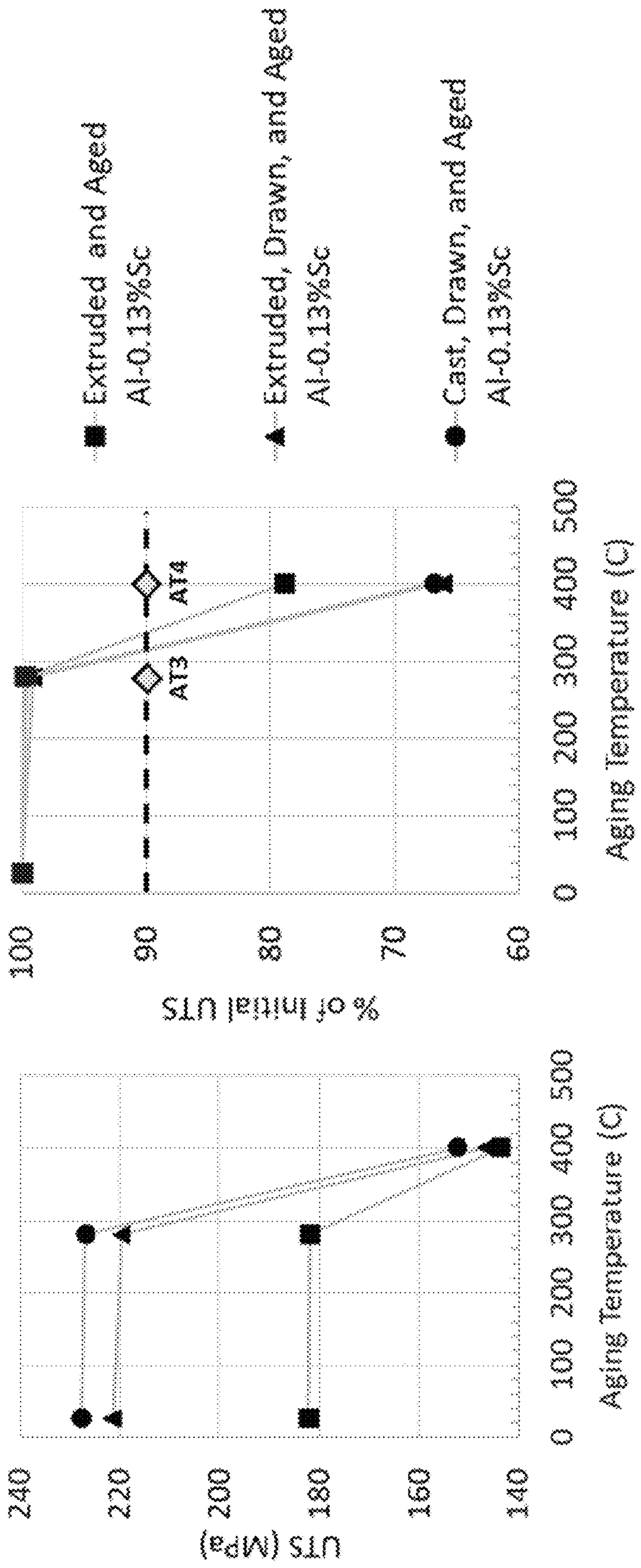
FIG. 5 includes graphs that show a comparison of thermal stability in an aluminum-scandium (Al—Sc) alloy with several different starting conditions.

Results of heat treatments performed on Al-0.13 wt % Sc wires with varying processing histories are shown in FIG. 5 which includes graphs showing a comparison of the thermal stability of an Al-0.13 wt % Sc alloy expressed as an absolute and relative change in tensile strength for several different starting conditions. All samples were precipitation-aged before these tests. From left to right, data points for each plot indicate the initial aged condition, the aged alloy after a one-hour treatment at 280° C., and the aged alloy after a one-hour treatment at 400° C. To qualify for IEC 62004 AT3 and AT4 thermal stability, samples need to maintain greater than 90% of the initial UTS after the respective heat treatment.

A one-hour 280° C. heat treatment shows essentially no effect on the strength of any of the drawn and aged Al-0.13 wt % Sc wires, indicating that neither the precipitation strengthening nor residual strength associated with cold working are noticeably affected. A one-hour 400° C. heat treatment reduces the strength of all Al-0.13 wt % Sc wires to about 150 MPa, even with an initial discrepancy of about 40 MPa between the strength of the as-extruded wire and the two drawn wires.

Figure 6:
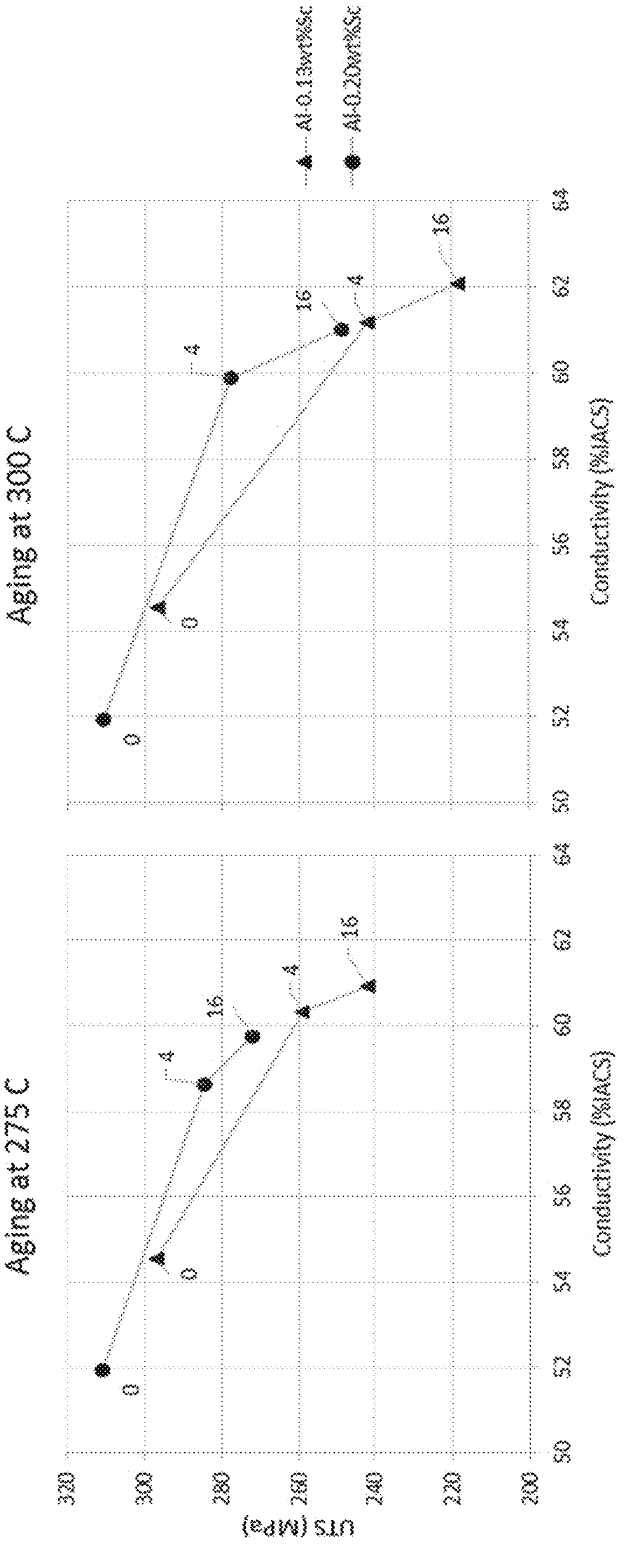
FIG. 6 includes graphs that show a comparison of ultimate tensile strength (UTS) of drawn and aged Al—Sc alloys with different heat treatments.
Figure 7:
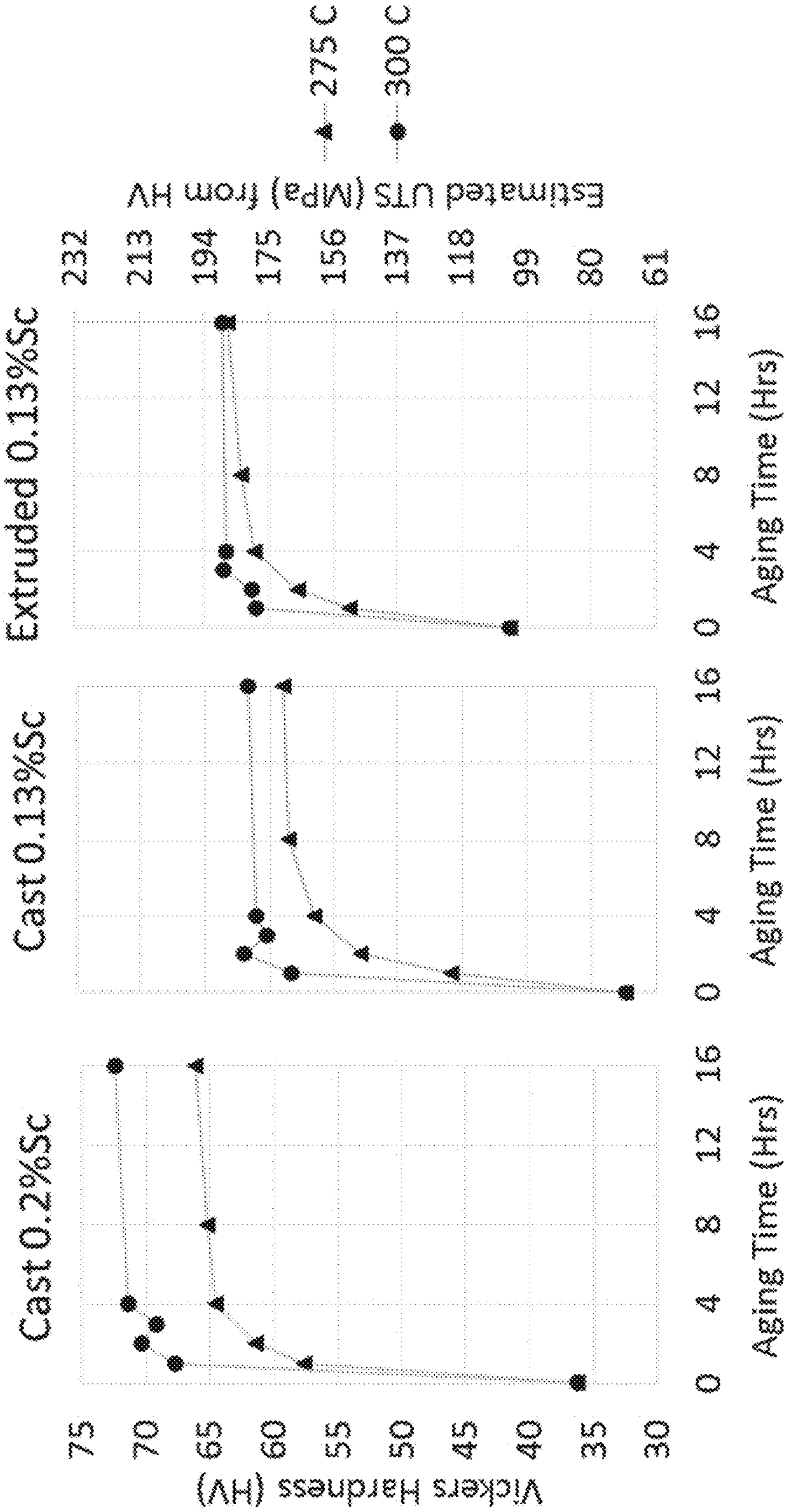
FIG. 7 includes graphs that show a comparison of hardness results in Al—Sc alloys, after various heat treatments with no cold working.

FIGS. 6 and 7 show further examples of combinations of properties achievable with binary Al—Sc alloys. In particular, FIG. 6 includes graphs that show a comparison of UTS of two drawn and aged Al—Sc alloys (Al-0.13 wt % Sc and Al-0.20 wt % Sc) with different heat treatments. The number labels for each point indicate the number of hours aged at the temperature indicated at the top of each plot. In this example, an aged Al-0.20 wt % Sc sample reaches properties of 280 MPa UTS, 60% IACS, and 6% elongation. However, due to the cost of Sc, a possible preferred embodiment tailors an alloy for the application by adjusting Sc concentrations and heat treatments. For instance, Al-0.13 wt % Sc can yield properties of either 242 MPa, 61% IACS, and 5% elongation or 259 MPa, 60% IACS, and 4% elongation, depending on the heat treatment.

FIG. 7 includes graphs that show a comparison of hardness results in Al—Sc binary alloys, after various heat treatments with no cold working. The rightmost axis shows an estimated UTS equivalent for samples, found experimentally to follow the following relationship:

$$UTS(MPa)=3.8*Hardness(HV)-53;(R^2=0.99)$$

In general, aging Al—Sc alloys for about 4 hours at 300° C. provides a beneficial heat treatment. The heat treatment can be customized to achieve different desired properties. Aging at higher temperatures (e.g., 325° C.) for very short times can yield acceptable results, although holding for extended periods at 325° C. can over-age the material.

As shown in FIG. 7, the Al-0.13 wt % Sc alloys produced by casting and by extrusion behaved very similarly to each other. This similarity is due, in large part, to the fact that the extrusion processing conditions are such that the alloy is extruded in a soft condition and is immediately viable for precipitation strengthening. By adjusting speed and temperature ranges of extrusion processing, the alloy could be extruded in a fully aged condition, in which case further aging treatments would have little effect. Another viable option to extrude aged Al—Sc alloys is to fully age the feedstock material and then extrude it at the lowest feasible temperature.

Example Al—Sc—Zr Results

The following examples largely cover rods produced by traditional casting processes, and wire produced by wire drawing the cast rods. Chemical analyses (e.g., XRF) were performed on samples taken from multiple locations within the casting to ensure an even distribution of alloying elements throughout the rods. While some adjustment of processing parameters can be made to achieve identical properties with production of this alloy using an alternate process (e.g., extrusion), the observed trends are consistently present in Al—Sc—Zr alloys over a range of compositions, production histories, and heat treatments.

Figure 8:
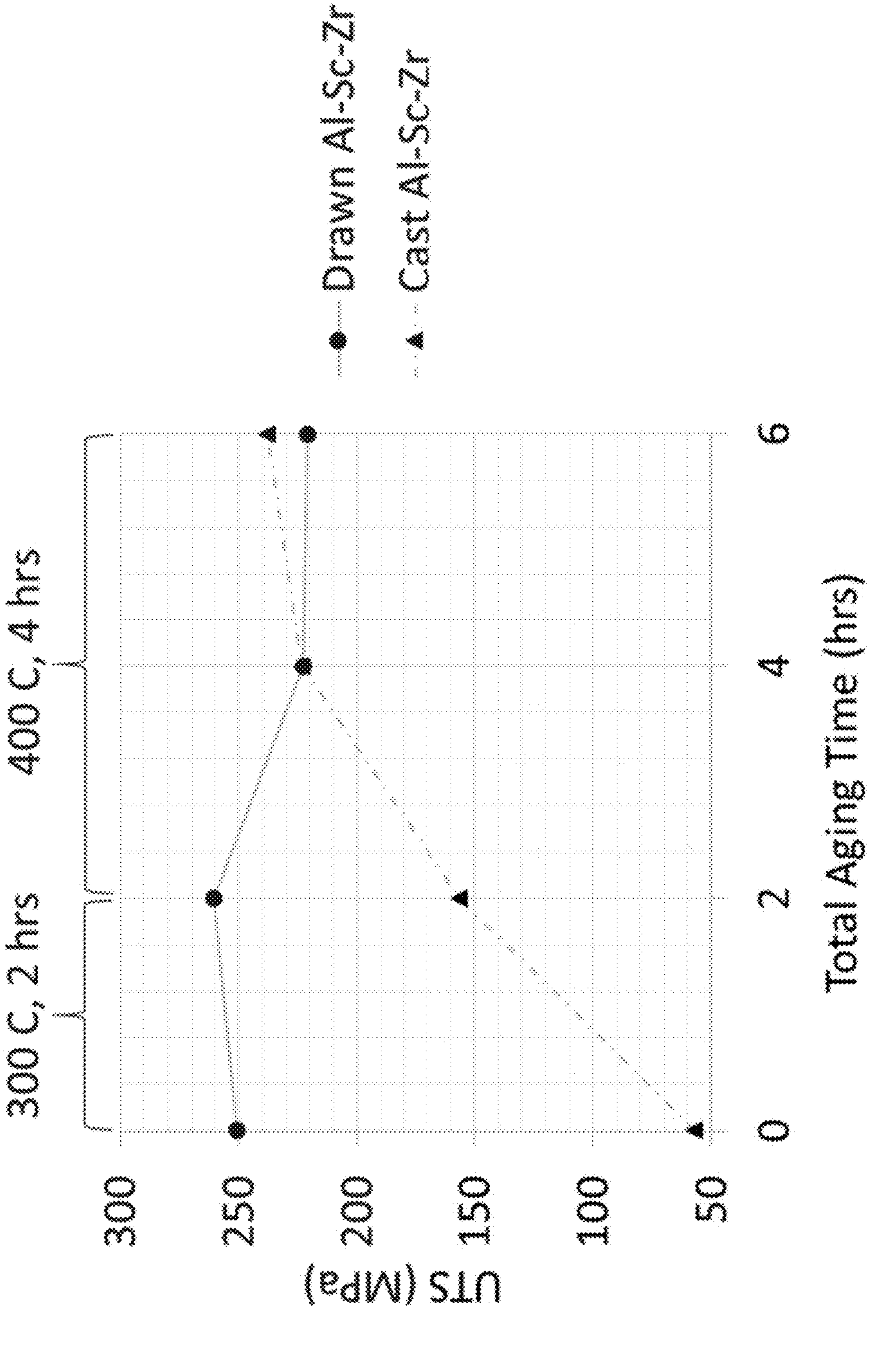
FIG. 8 is a graph that shows a progression of strength with aging in a cast Al-0.13 wt % Sc-0.27 wt % Zr sample, with and without cold working.

FIG. 8 is a graph that shows progression of strength in a cast and in a cold worked (drawn) Al-0.13 wt % Sc-0.27 wt % Zr sample with aging for 2 hours at 300° C., and with aging for an additional 2 and 4 hours at 400° C. The plot demonstrates the similarity in the properties of the two aged alloy products with different processing, as well as the ability of the alloy to maintain strength even after 400° C. heat treatments.

For example, as shown in FIG. 8, the strength of this Al—Sc—Zr alloy does not decrease significantly between two hours at 400° C. and 4 hours at 400° C. and, in fact, increases by about 6% between these times in cast samples without cold working. This suggests that properly aged Al—Sc—Zr alloys satisfy at least one requirement of the IEC 62004 AT4 thermal stability specification, in that they can maintain greater than 90% of their initial UTS after a one-hour heat treatment at 400° C.

Figure 9:
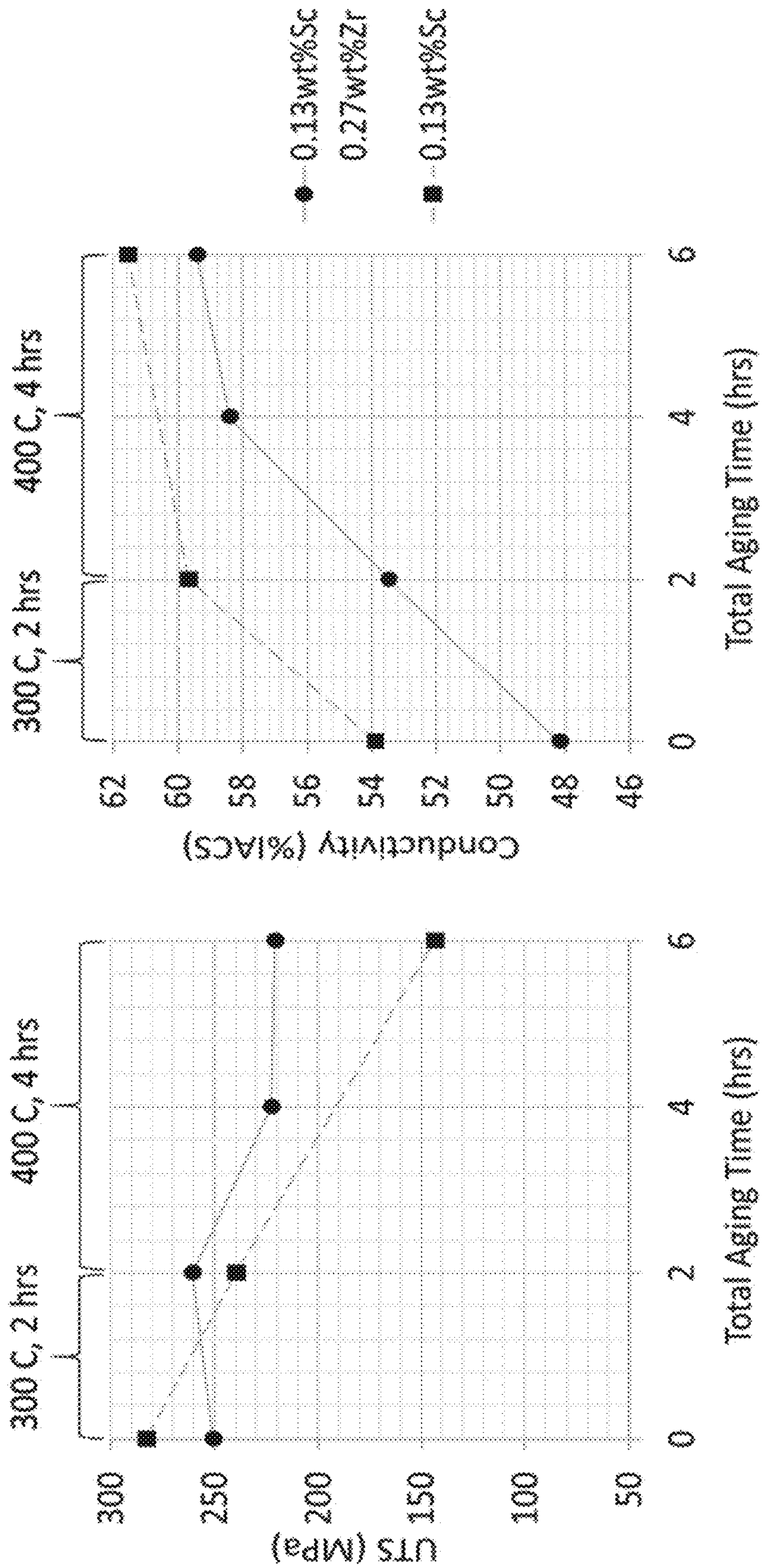
FIG. 9 includes graphs showing a comparison of drawn 0.5 mm Ø Al-0.13 wt % Sc-0.27 wt % Zr wire and drawn 0.5 mm Ø Al-0.13 wt % Sc wire.

FIG. 9 includes graphs that show comparisons of drawn 0.5 mm Ø Al-0.13 wt % Sc-0.27 wt % Zr wire and drawn 0.5 mm Ø Al-0.13 wt % Sc wire. The plots demonstrate the strength and thermal conductivity benefits of adding Zr to Al—Sc alloys, as well as the small associated decrease in electrical conductivity.

The effect of precipitation behavior can be more difficult to observe and quantify in as-drawn or as-rolled samples because of concurrent relaxation of work hardening during aging, but the final properties of Al—Sc—Zr alloys can be a significant improvement over binary Al—Sc alloys. See, e.g., FIG. 7. Compared to a drawn and aged Al—Sc alloy, the strength and thermal stability of a drawn and aged Al—Sc—Zr alloy with the same wt % of Sc are significantly higher (260 vs 240 MPa after 300° C. aging for 2 hours, 220 vs 140 MPa after 400° C. aging for 4 hours), while the electrical conductivity is slightly lower (59.5 vs 61.5% IACS after 400° C. aging for 2 hours).

Er and Yb Additions

To further augment Al—Sc—Zr alloys in busbar applications, other trialuminide forming alloying additions such as Er and/or Yb can be added. These additions can partially substitute for Sc and, as such, reduce the amount of Sc necessary to reach a target strength. The aged Al—Sc—Zr alloys with Er and Yb additions can improve creep behavior over aged ternary Al—Sc—Zr alloys. These elements can also be added in addition to existing Al—Sc—Zr alloys without reducing the Sc or Zr contents to increase the achievable phase fraction of trialuminide precipitate phase. The compositions of these alloys can be balanced for specific applications, to satisfy limitations on cost and requirements for electrical conductivity, etc.

Additional Examples

An example of a busbar for an automotive application can include aluminum (Al) in an amount of between 98 and 99.99 percent by weight (wt %) and scandium (Sc) additions in an amount (e.g., concentration) of 0.01 to 0.5 wt % (e.g., 0.1 to 0.2 wt %). The busbar can further include an amount of zirconium (Zr) in a range of 0.01 to 0.5 wt % (e.g., 0.1 to 0.33 wt %), an amount of erbium (Er) in a range of 0.01 to 0.5 wt %, and/or an amount of ytterbium (Yb) in a range of 0.01 to 0.5 wt %.

In another example, a busbar includes an Al alloy and one or more strengthening materials selected from the group consisting of Sc, Zr, Er, and/or Yb additions. The busbar can have electrical conductivity greater than 50% International Annealed Copper Standard (IACS), preferably greater than 55% IACS, more preferably greater than 58% IACS, and an ultimate tensile strength (UTS) greater than 150 MPa. In one example, the busbar can have electrical conductivity of 60% IACS or greater and UTS greater than 250 MPa. The busbar can qualify for IEC 62004 AT3 thermal stability or IEC 62004 AT4 thermal stability.

Examples include a process for producing an Al-alloy busbar can include solutionizing a feedstock material and extruding the solutionized feedstock material to produce an Al-alloy busbar. In one example, the feedstock material includes an Al-alloy with one or more strengthening materials selected from the group consisting of Sc, Zr, Er, and/or Yb additions.

Another example process for producing an Al-alloy busbar can include fully aging a feedstock material and extruding the fully aged feedstock material to produce an Al-alloy busbar. In one example, the feedstock material includes an Al-alloy with one or more strengthening materials selected from the group consisting of Sc, Zr, Er, and/or Yb additions.

Another example process for producing a busbar includes extruding a softened Al—Sc busbar or solutionizing the Al—Sc busbar, and shaping the Al—Sc busbar into a target geometry. That is, the busbar is a softened Al—Sc busbar that includes an Al-alloy with Sc additions. The process can further include applying an aging heat treatment after shaping the Al—Sc busbar to increase strength. The Al—Sc busbar can further include one or more strengthening materials selected from the group consisting of Sc, Zr, Er, and Yb additions.

From the foregoing, it will be appreciated that specific embodiments of the invention have been described herein for purposes of illustration, but that various modifications may be made without deviating from the scope of the embodiments.

The invention claimed is:

1. A busbar comprising:

an aluminum (Al) alloy consisting of:

aluminum;

an amount of scandium (Sc) in a range of 0.01 to 0.5 wt %; and unavoidable impurities.

2. The busbar of claim 1, wherein the amount of Sc is in a range of 0.1 to 0.2 wt %.

3. The busbar of claim 1, wherein the busbar has an electrical conductivity greater than 50% International Annealed Copper Standard (IACS) and an ultimate tensile strength (UTS) greater than 150 MPa.

4. The busbar of claim 3, wherein the electrical conductivity of the busbar is greater than 55% IACS and the UTS of the busbar is greater than 250 MPa.

5. The busbar of claim 3, wherein the electrical conductivity of the busbar is greater than 58% IACS and the UTS of the busbar is greater than 250 MPa.

6. The busbar of claim 1, wherein the busbar qualifies for IEC 62004 AT3 thermal stability.

7. The busbar of claim 1, wherein the busbar qualifies for IEC 62004 AT4 thermal stability.

8. The busbar of claim 1, further comprising:

nanoscale carbon particles in an amount between 0.01 and 2.0 wt %.

9. The busbar of claim 1, wherein the Sc is uniformly distributed throughout an entirety of the Al alloy.

10. A busbar comprising:

an aluminum (Al) alloy consisting of:

aluminum;

an amount of scandium (Sc) in a range of 0.01 to 0.5 wt %;

one or more elements from the group consisting of: zirconium (Zr), erbium (Er), and ytterbium (Yb); and unavoidable impurities.

11. The busbar of claim 10, wherein the amount of Sc is in a range of 0.1 to 0.2 wt %.

12. The busbar of claim 10, comprising:

an amount of Zr in a range of 0.01 to 0.5 wt %.

13. The busbar of claim 10, comprising:

an amount of Er in a range of 0.01 to 0.5 wt %.

14. The busbar of claim 10, comprising:

an amount of Yb in a range of 0.01 to 0.5 wt %.

15. The busbar of claim 10, further comprising:

nanoscale carbon particles in an amount between 0.01 and 2.0 wt %.

16. The busbar of claim 10, wherein the Sc and one or more other elements are uniformly distributed throughout an entirety of the Al alloy.

* * * * *